(12) United States Patent
Davis et al.

(10) Patent No.: US 7,617,526 B2
(45) Date of Patent: *Nov. 10, 2009

(54) BLOCKING OF SPAM E-MAIL AT A FIREWALL

(75) Inventors: John Fred Davis, Durham, NC (US); Kevin David Himberger, Durham, NC (US); Clark Debs Jeffries, Chapel Hill, NC (US); Garreth Joseph Jeremiah, North York (CA)

(73) Assignee: International Business Machines Corporation, Armonk, NY (US)

( * ) Notice: Subject to any disclaimer, the term of this patent is extended or adjusted under 35 U.S.C. 154(b) by 778 days.

This patent is subject to a terminal disclaimer.

(21) Appl. No.: 11/244,993

(22) Filed: Oct. 6, 2005

(65) Prior Publication Data
US 2006/0037070 A1 Feb. 16, 2006

Related U.S. Application Data

(63) Continuation-in-part of application No. 10/442,008, filed on May 20, 2003, now Pat. No. 7,308,716.

(51) Int. Cl.
*G06F 9/00* (2006.01)
(52) U.S. Cl. .............. 726/11; 726/22; 726/23; 726/24; 726/25; 713/178; 715/752
(58) Field of Classification Search ............. 726/2, 726/3, 4, 11, 21, 22–25, 26; 709/206, 203; 707/500, 104.1; 713/201, 178; 715/752
See application file for complete search history.

(56) References Cited

U.S. PATENT DOCUMENTS

| | | | |
|---|---|---|---|
| 5,557,742 A | 9/1996 | Smaha et al. | 395/186 |
| 5,621,889 A | 4/1997 | Lermuzeaux et al. | 395/186 |
| 5,991,881 A | 11/1999 | Conklin et al. | 713/201 |
| 6,189,035 B1 | 2/2001 | Lockhart et al. | 709/229 |
| 6,249,805 B1 | 6/2001 | Fleming | 709/206 |
| 6,282,546 B1 | 8/2001 | Gleichauf et al. | 707/102 |
| 6,298,340 B1 | 10/2001 | Calvignac et al. | 707/3 |
| 6,405,318 B1 | 6/2002 | Rowland | 713/200 |

(Continued)

FOREIGN PATENT DOCUMENTS

JP 2001057554 2/2001

(Continued)

OTHER PUBLICATIONS

Raeth, P. et al. "Finding Events Automatically in Continuously Sampled Data Streams via Anomaly Detection", IEEE National Aerospace and Electronics conference (NAECON) Oct. 2000, pp. 580-587.

(Continued)

*Primary Examiner*—Taghi T Arani
*Assistant Examiner*—Jason Lee
(74) *Attorney, Agent, or Firm*—John Pivnichny

(57) ABSTRACT

A method of blocking spam at a firewall involves applying blocking measures for an adaptively determined duration. The blocking measure is then suspended while determining whether the spam has ended. If so, the method resets to an initial state. Otherwise, the blocking measure is re-applied for a second duration.

9 Claims, 7 Drawing Sheets

U.S. PATENT DOCUMENTS

| | | | |
|---|---|---|---|
| 6,421,709 B1 | 7/2002 | McCormick et al. | 709/206 |
| 6,460,050 B1 * | 10/2002 | Pace et al. | 707/104.1 |
| 6,477,651 B1 | 11/2002 | Teal | 713/200 |
| 6,484,197 B1 | 11/2002 | Donohue | 709/206 |
| 6,487,666 B1 | 11/2002 | Shanklin et al. | 713/201 |
| 6,530,024 B1 | 3/2003 | Proctor | 713/201 |
| 6,691,156 B1 * | 2/2004 | Drummond et al. | 709/206 |
| 7,308,716 B2 * | 12/2007 | Danford et al. | 726/23 |
| 2002/0087882 A1 | 7/2002 | Schneier et al. | 713/201 |
| 2002/0101819 A1 | 8/2002 | Goldstone | 370/229 |
| 2003/0043853 A1 | 3/2003 | Doyle et al. | 370/489 |
| 2003/0074397 A1 * | 4/2003 | Morin et al. | 709/203 |
| 2004/0215977 A1 * | 10/2004 | Goodman et al. | 713/201 |

FOREIGN PATENT DOCUMENTS

| | | |
|---|---|---|
| JP | 2002252654 | 9/2002 |
| JP | 2003143182 A | 4/2003 |
| JP | 92003125005 A | 4/2003 |
| JP | 200329910 A | 8/2003 |
| WO | WO0225402 | 3/2002 |

OTHER PUBLICATIONS

Mikula, D. M. M. et al. "Spam Blocking with a Dynamically updated Firewal Ruleset", pp. 13-20 of the Proceedings of LISA '02: Sixteenth Systems Administration Conference, (Berkeley, CA: USENIX Association, 2002).

* cited by examiner

BLOCKING OF SPAM E-MAIL AT A FIREWALL

This application is a continuation-in-part of prior application Ser. No. 10/442,008, filed May 20, 2003 now U.S. Pat. No. 7,308,716.

FIELD OF THE INVENTION

The present invention relates to the field of networking and particularly to the filed of blocking spam messages from being further transmitted over a network.

BACKGROUND OF THE INVENTION

Internet-based communication is now frequently subject to electronic vandalism. As the sophistication of measures intended to combat such vandalism grows, new forms of vandalism appear. For example, a worm known as W32.SQLExp.Worm, or more simply as the Slammer Worm, appeared in late January, 2003. The Slammer Worm inflicted damage upon its victims by sending 376-byte packets to UDP port 1434, which is the SQL Server Resolution Server Port, and in effect provided a Denial of Service attack. One highly damaging attribute of the Slammer Worm was its unprecedented rate of growth and propagation, reportedly doubling itself every 8.5 seconds.

Spam (unsolicited and unwanted e-mail) can pose serious Denial of Services (DOS) problems by consuming resources. Spam can also carry payloads such as Trojans (code that may attempt to acquire unauthorized access to files or engage in other malicious activity). The problem of automatically discarding spam traffic is difficult to solve satisfactorily because the traffic can be at a high rate and can be difficult to distinguish from legitimate-traffic.

Such extreme forms of vandalism exceed the capabilities of known defensive mechanisms, sometimes even turning the defensive mechanisms themselves into Pyrrhic exercises that are accompanied by so many unintended consequences as to make their benefits questionable. For example, to combat the Slammer Worm, all traffic that includes UDP port 1434 in a source or destination address may simply be blocked. Unfortunately, this disrupts any flow of legitimate traffic that happens to include the same identification. Perhaps more troublesome, any appearance of legitimate traffic for UDP 1434 may trigger defensive measures even in the absence of the Slammer Worm.

Instances of invoking defensive measures in the absence of an intended trigger may generally be called false positives. Conversely, failing to recognize an intended trigger, or allowing any substantial delay once a trigger is detected, may permit fact-acting agents of vandalism such as the Slammer Worm to inflict severe damage before being brought under control. Such instances of failing to invoke defensive measures in the presence of an intended trigger may generally be called false negatives.

To combat rapidly propagating agents of vandalism such as the Slammer Worm, or of distributing spam e-mail, there is a need for an improved method of applying measures that defend against malicious traffic, where the improved method has a low rate of false positives, so that legitimate traffic unrelated to vandalism is not blocked, and also has a low rate of false negatives, so that fast-acting agents of vandalism are not allowed to inflict significant damage before they are blocked.

SUMMARY OF THE INVENTION

The present invention includes a method of progressive response that applies and suspends blocking measures for an adaptive duration to prevent the transmission of spam e-mail in a way that minimizes the adverse consequences of false positives and false negatives.

The method starts in a state of readiness to act, wherein a detector monitors for spam traffic. When spam is detected, the detector notifies protective equipment such as a firewall or a router to apply a blocking measure against traffic that bears the distinguishing marks of spam traffic. The blocking measure is maintained for an initial duration, after which it is suspended while another test is made to determine whether the spam is still evident. If the spam is no longer evident, the method returns to the state of readiness.

Otherwise, (i.e., spam is still evident) the duration is adapted and the method begins to execute a loop. The loop includes the steps of re-applying the blocking measure for the duration, suspending the blocking measure at the end of the duration, and testing again for spam while the blocking measure is suspended. Each time that spam is detected during execution of the loop, the duration is again adapted, for example increased in accordance with a monotone non-decreasing function that may be subject to an upper bound which prevents the occurrence of extreme durations. The blocking measure is then re-applied for the newly specified duration. When a test indicates that spam is no longer evident, the duration is again adapted by re-setting it to its initial value, and the method returns to the state of readiness where the blocking measure is not applied.

Thus, with the present invention, the blocking measure is applied quickly once malicious traffic is detected and maintained as long as a threat of malicious traffic is evident, thereby minimizing the adverse consequences of false negatives, and yet also suspended as quickly as possible, once the threat of malicious traffic has passed, thereby minimizing the adverse consequences of false positives, consistent with minimizing unproductive churning and response to mid-attack false negatives. These and other aspects of the present invention will be more fully appreciated when considered in light of the following detailed description and drawings.

BEST MODE FOR CARRYING OUT THE INVENTION

The present invention provides a progressive response that applies and suspends blocking measures to defend against network anomalies such as malicious network traffic, in a way that minimizes the adverse consequences of false positives and false negatives.

Figure 1:
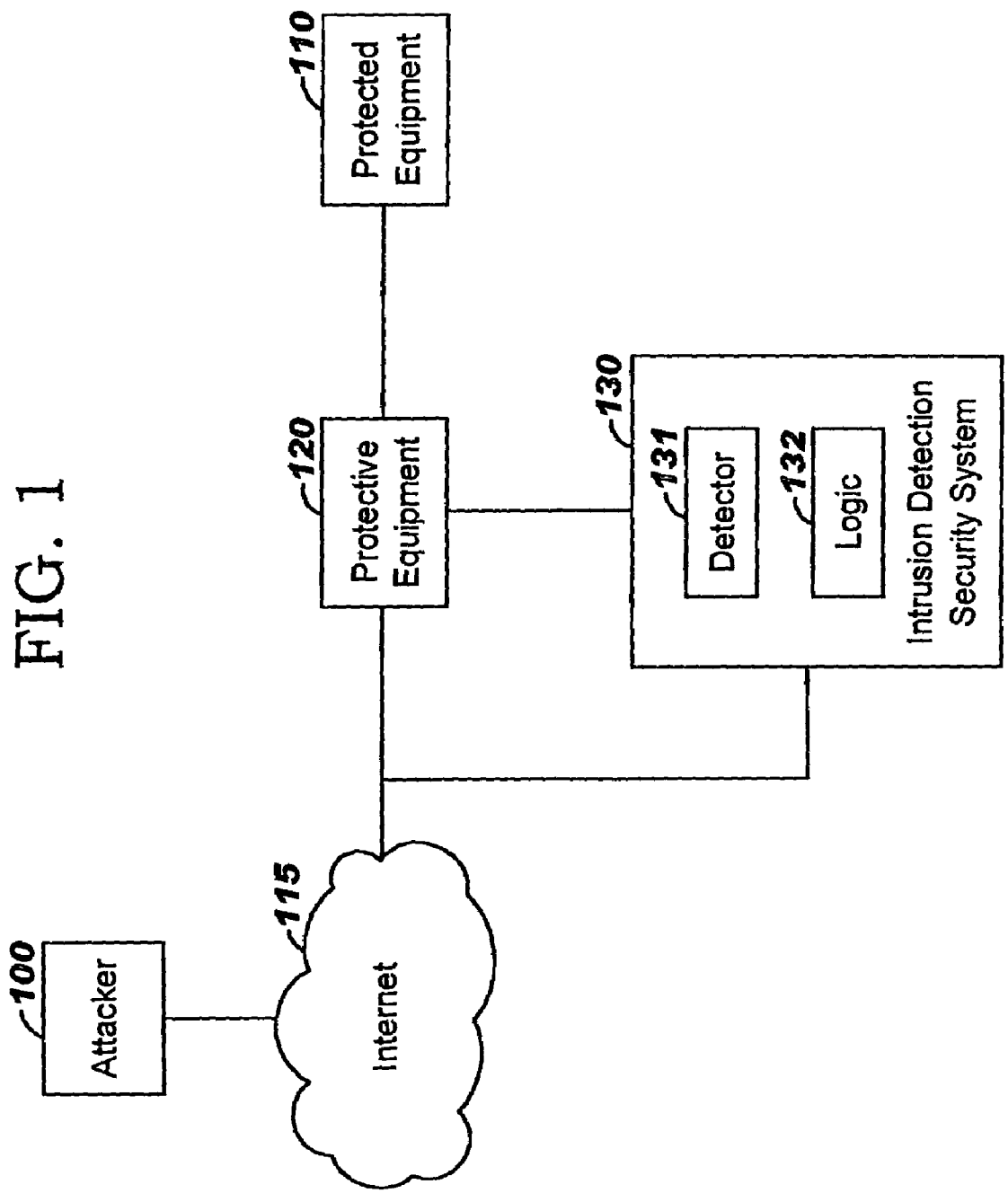
FIG. 1 is a diagram showing an exemplary context suitable for application of the present invention.

As shown in FIG. 1, a vandal or attacker 100 may attempt to inflict damage upon protected equipment 110, for example a web server or a network-connected personal computer, through the Internet 115 or another communication network. In the context of the present invention, such vandalism may include denial of service (DoS) attacks such as bandwidth attacks and connectivity attacks, distributed denial of service (DDoS) attacks, targeted common gateway interface (CGI) attacks, HTTP-based attacks, worms such as the W32.SQLExp.Worm, WWW attacks, reconnaissance activity, and so forth, all of which are generically called "network anomalies" here for descriptive convenience.

Using methods known to those skilled in the art, a detector 131 detects the presence of network anomalies by observing malicious traffic incoming to, or originating from, the protected equipment 110. Responsive to the output of the detector 131, which output at time t is denoted here as D(t), logic 132 oversees steps of the inventive method for instructing protective equipment 120 to apply, for an adaptively determined duration and then to suspend, blocking measures that guard the protected equipment 110 against network anomalies. These steps are explained in more detail below.

Here, the term "blocking measure" is to be interpreted widely as the enforcement of a defensive rule, and includes, for example, discarding, logging, or rate limiting traffic from a particular source address or set of source addresses; discarding, logging, or rate limiting traffic to a particular destination address or set of destination addresses; discarding, logging, or rate limiting UDP traffic from the Internet 115 to a particular subnet or set of subnets; discarding, logging, or rate limiting UDP traffic from the Internet 115 to a subnet with a particular UDP destination port or set of UDP destination ports; and so forth, including various combinations of the foregoing.

More generally, it is important to note that the structural details shown in FIG. 1 are illustrative rather than limiting. For example, the protective equipment 120 may be part of a router, or of a firewall, or of other suitable equipment. Either or both of the detector 131 or the logic 132 may reside within the protective equipment 120, or within an intrusion detection security system 130 as shown for convenience in FIG. 1, or may reside elsewhere in the structure of FIG. 1. The logic 132 may be dedicated hardware or a dedicated processor such as a microprocessor, or may be provided functionally by instructions executed by a processor that has other purposes as well.

Figure 2:
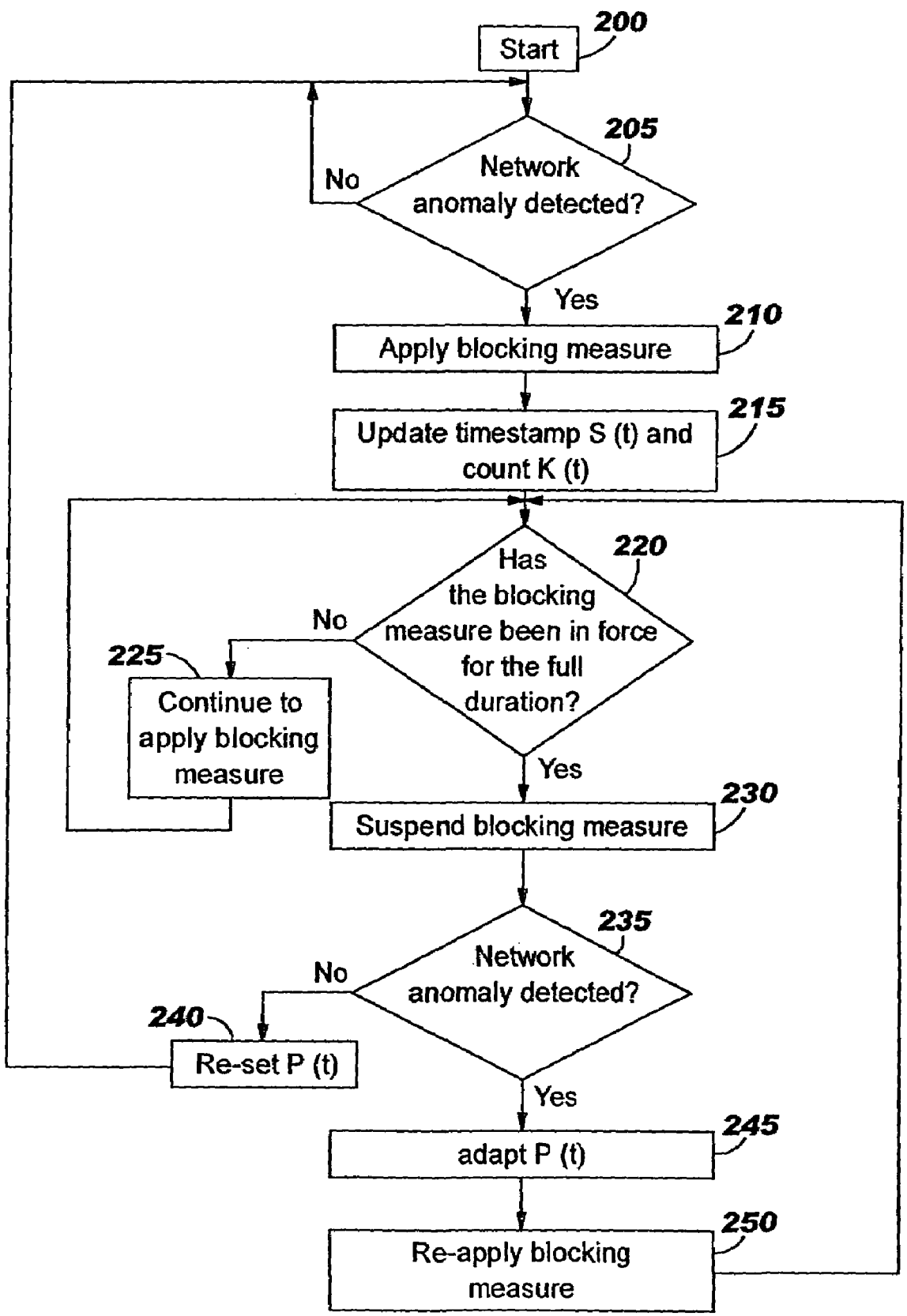
FIG. 2 is a flowchart that shows aspects of the operation of the inventive method in the context of FIG. 1.

As already mentioned, the invention includes methods for responding progressively to the detection of network anomalies by adapting the duration of blocking measures, exemplary aspects of which methods are shown in the flowchart of FIG. 2.

In a preferred embodiment of the inventive method, time is partitioned into intervals of constant length, which is denoted here as Dt. The system is updated at integer multiples of the interval Dt, that is, at the times Dt, 2Dt, 3Dt, and so forth. Let S(t) be a time stamp that indicates the absolute start time of the most recent sequence of time values with consecutive application of a blocking measure. This is an internal variable that is periodically stored, refreshed, and restored with period Dt. Let K(t) be the count of the number of times, within the present epoch of consecutive detections of network anomaly, that the blocking measure has been suspended and then re-applied in response to the detection of a persistent network anomaly. K(t) is re-set to zero when the blocking measure is suspended and the network anomaly is no longer detected. Further, Let P(t) be the duration of the blocking measure, which has an initial value $P_0$, and which is adapted to provide a progressive response, for example adapted according to a function of K(t) as explained below.

As shown in FIG. 2, the method starts (step 200) in a state of readiness, wherein the protective equipment 120 has not yet applied any blocking measures. P(t) is set to its initial value $P_0$, being a positive integer multiple of Dt, and the variables K(t) and S(t) are set to zero. The detector 131 tests for network anomalies (step 205). If no network anomaly is detected, the detector 131 continues to test (step 205). Otherwise (i.e., a network anomaly is detected), the protective equipment 120 is instructed to apply a blocking measure (step 210). The variables S(t) and K(t) are then updated (step 215). The current value of P(t), which at this point is still $P_0$, is compared (step 220) with the time lapsed since the last test for network anomalies to determine whether the blocking measure has been applied (i.e., has been in force) for the full duration. If the blocking measure has not been applied for the full duration P(t), the blocking measure is continued (step 225) while the comparison with P(t) is made again (step 220).

Otherwise (i.e., the blocking measure has been applied for the full duration P(t)), the blocking measure is suspended (step 230). In a preferred embodiment, the blocking measure is suspended for one time interval Dt, although this is not a necessary condition of the invention. The detector 131 tests again to determine whether the network anomaly is still evident (step 235). If the network anomaly is no longer evident, P(t) is reset to its initial value $P_0$ (step 240), and the method returns to the state wherein the detector 131 monitors for network anomalies (step 205).

Otherwise (i.e., an anomaly has been detected at step 235), the value of P(t) is adapted (step 245), the blocking measure is re-applied (step 250), and the method returns to the state wherein the adapted value of P(t) is compared (step 220) with the time lapsed since the last test for network anomalies.

The value of the variable P(t), which represents the duration of the blocking measure, may be adapted, for example by increasing the value according to a monotone non-decreasing function of, for example, K(t), optionally subject to a cap or maximum value or upper bound, which upper bound may be expressed as a function of K(t). In a preferred embodiment, P(t) may be increased according to $P(t)=(M^{\wedge}(K(t)-1))*P_0$, where M is a positive real number, and a maximum value of L is imposed on K(t). Preferred embodiments have used the integer values M=2 and M=8, the first of which causes the value of P(t) to double each time it increases. In other embodiments, the value of P(t) may increase in other ways, for example linearly, exponentially as a function of the value of P(t), logarithmically, randomly, asymptotically to a prescribed maximum, according to a table of pre-computed values, and so forth.

The following set of difference equations provides another way of describing aspects of the embodiment of the invention wherein the blocking measure is suspended in step 230 for a length of time Dt while the test for the anomaly is made in step 235. In these equations, let B(t) characterize the state of the blocking measure (a value of one means that the blocking measure is applied, a value of zero means that the measure is suspended). As mentioned above, let D(t) characterize the output of the detector 131 as of its last measurement (a value of one means that an anomaly is evident, a value of zero means that no anomaly is evident). Then:

$$B(t+Dt)=D(t)*(1-B(t))+(1-D(t)*(1-B(t))) \text{ *if } (t+Dt-S(t)<P(t), \text{ then } 1, \text{ else } 0),$$

$$S(t+Dt)=B(t+Dt)*(1-B(t))*(t+Dt-S(t))+S(t), \text{ and}$$

$$K(t+Dt)=\min\{L, D(t)*(K(t)+B(t+Dt)*(1-B(t))+(1-D(t))*B(t+Dt)*(K(t)+1-B(t))\}.$$

Also note that B(t+Dt) characterizes the decision to apply the blocking measure during the time interval t,t+Dt, whereas D(t) characterizes the output of the detector 131 during the interval of time t−Dt,t.

A preferred embodiment of the invention, described above, uses time to characterize and adapt the duration of the blocking measure. Another embodiment of the invention uses a count of traffic, such as a count of packets, bits, or frames, rather than time, to characterize and adapt the duration. In such embodiments, the blocking measure is applied until, for example, the requisite number X of packets is seen by the detector 131 or otherwise sensed. In a preferred embodiment, X has the value X=1000. These kinds of embodiments may be preferred to the aforementioned time-characterized embodiments when the bandwidth of the data stream incoming to the protected equipment 110 is highly variable.

In the embodiments of the invention described so far, the inventive method is responsive to the detection of anomalies. The invention also encompasses other embodiments wherein the method responds to penetrations rather than to detections. Here, a penetration is a time step in which malicious traffic arrives when no appropriate blocking measure is active. Such embodiments may be described by a similar set of difference equations as follows.

Over the time interval t−Dt,t, an attack might or might not occur. If an attack occurs, then denote its presence at time t by A(t)=1 and hold that value for the interval t,t+Dt. If an attack does not occur, the value of A(t) is A(t)=0 over the same interval. If a blocking measure is applied over the interval t,t+Dt, then B(t)=1; otherwise B(t)=0. Define penetration N(t)=A(t)*(1−B(t)). A timestamp S(t) and the count K(t) are updated. The blocking measure is applied (held on) for the duration P(t). Then:

$$B(t+Dt)=N(t)*(1-B(t))+(1-N(t))*(1-B(t))) *\text{if } (t+Dt-S(t))<(M^{\wedge}(K(t)-1))*P_0 \text{ then 1, else 0}),$$

$$S(t+Dt)=B(t+Dt)*(1-B(t))*(t+Dt-S(t))+S(t), \text{ and}$$

$$K(t)=\min\{L, N(t)*(K(t)+1)+(1-N(t))*B(t)*K(t)\}.$$

Figure 3:
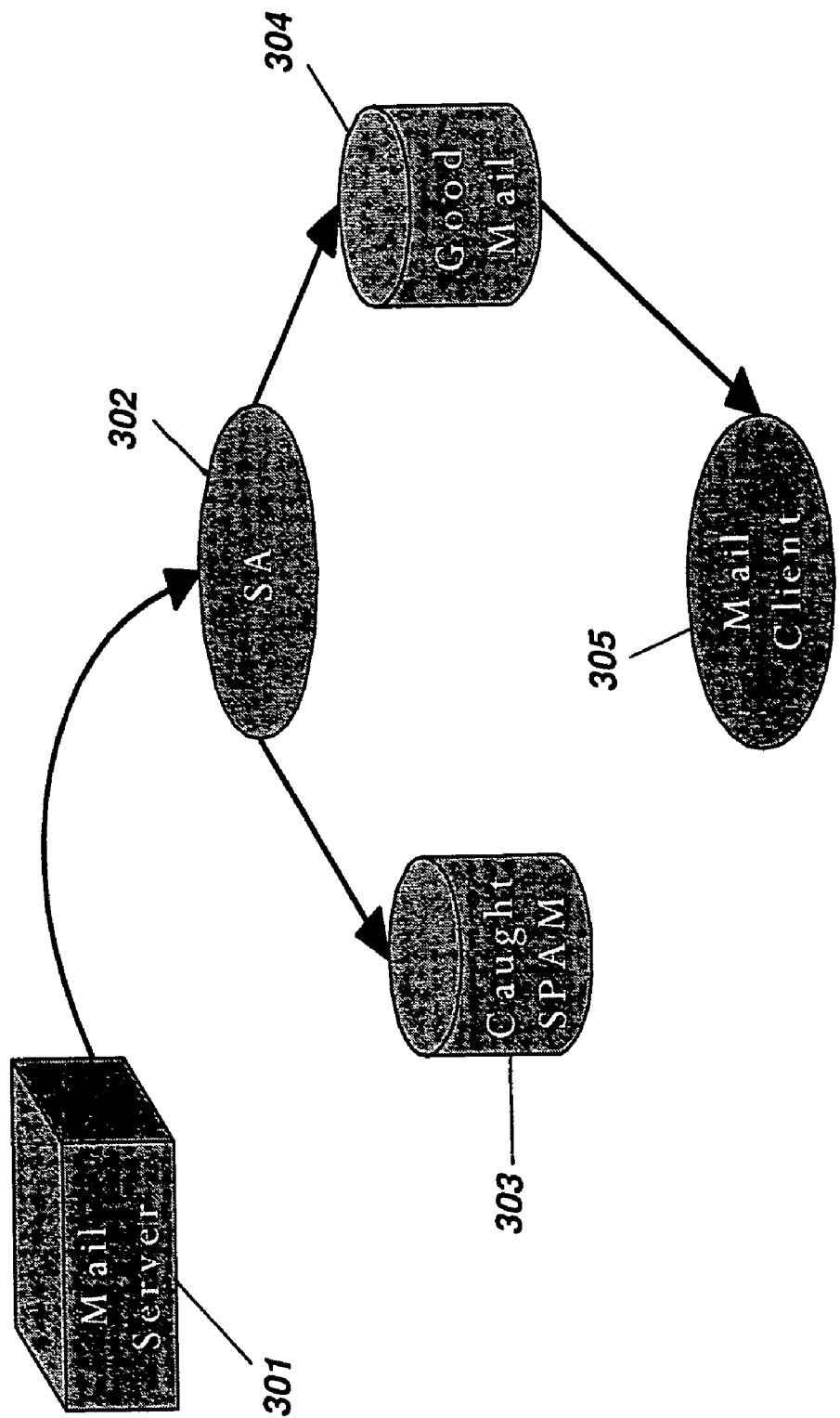
FIG. 3 depicts the prior art spam assassin type of method.

In FIG. 3, there is shown a block diagram of prior art spam assassin type methods of dealing with spam e-mail. An e-mail arriving from mail server 301 may be recognized as spam at 302 based on several known methods. A mail delivery agent may perform a reverse lookup of the host domain name server (dns) records. Or the agent may verify that the host is not a well known spammer or open relay by consulting a black hole list or similar listing. The agent may also configure the server so it is not an open relay and thus prevent its use as a tool by spammers.

Alternatively, during e-mail post processing, the mail may be checked for keywords in the text, such as "Make Money Fast", or for use of a large number of Hypertext Mark-up Language (HTML) tags, or for use of a numeric from field, or false statements such as the mailer indicating a specific format but the fields are not in that format, or for an e-mail that is binary, HTML only or attachment only.

Also, in the prior art methods of FIG. 3, traffic patterns may be checked to recognize a spam e-mail. Patterns such as multiple simple mail transfer protocol (SMTP) connections from the same host, multiple failed delivery attempts, or a known spam host can be used.

Caught spam e-mail messages 303 are blocked or diverted while normal good e-mail 304 is forwarded to the e-mail client 305.

Figure 4:
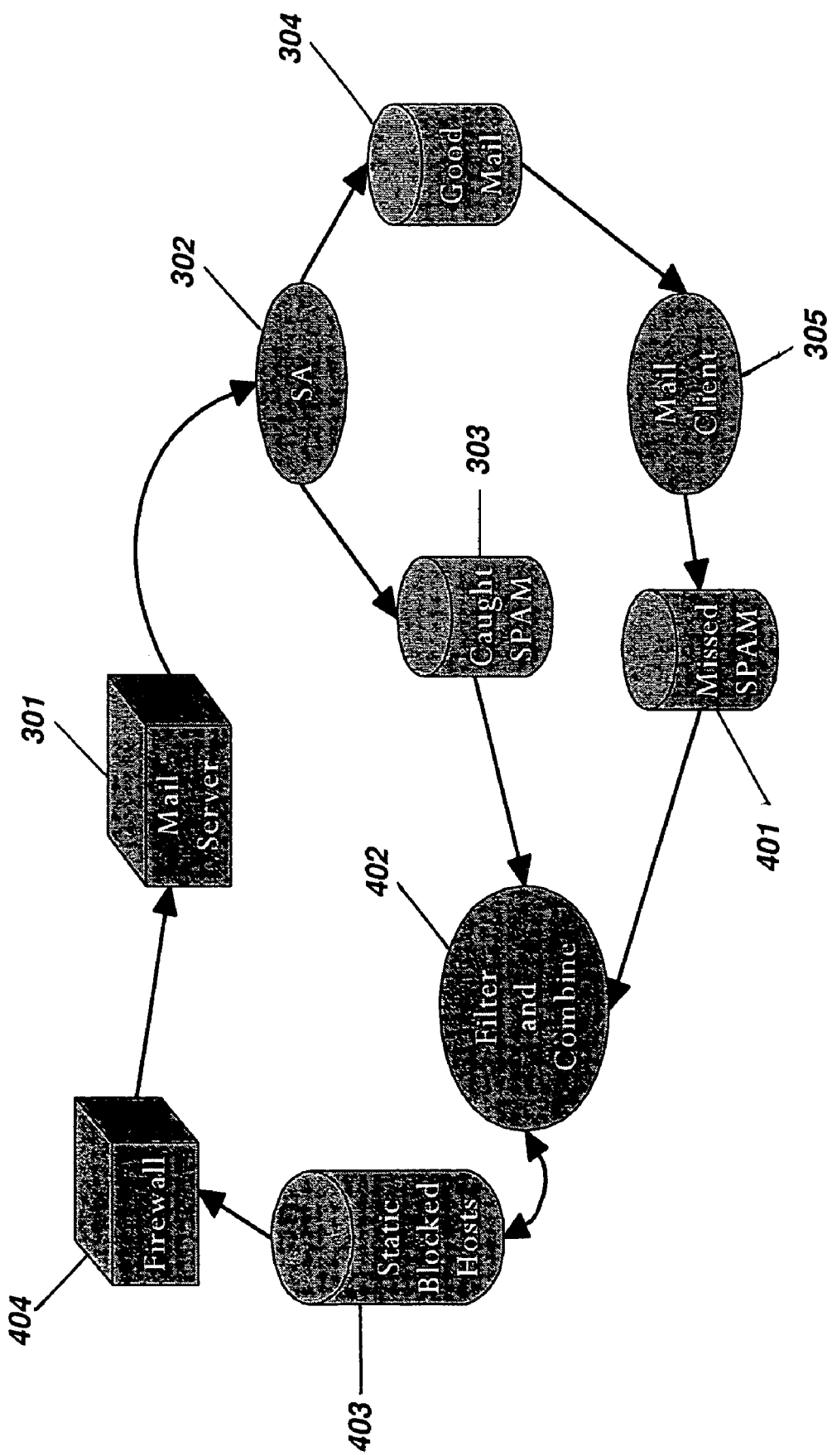
FIG. 4 shows a novel method of spam filtering using a firewall.

In FIG. 4, there is shown a method of blocking spam at a firewall in accordance with the present invention. Mail client 305 may identify a message that originally passed through as good e-mail, is actually spam 401. This missed spam, along with caught spam 303, are filtered and combined to generate a list 403 of static blocked hosts. The list may also include subnets, i.e., ranges of source addresses defined as a prefix, to be blocked. The list is used in firewall 404 to apply a blocking measure for an adaptively determined duration as described above. An algorithm for phasing out source address filters is included to limit the number of rules and thereby prevent any impact to firewall performance. For example, all blocking rules may be removed after a pre-specified number of rules is reached, or periodically after a pre-specified time interval is reached. Those skilled in the art will recognize that a subset of all rules or even individual rules can be removed based on these criteria.

Figure 5:
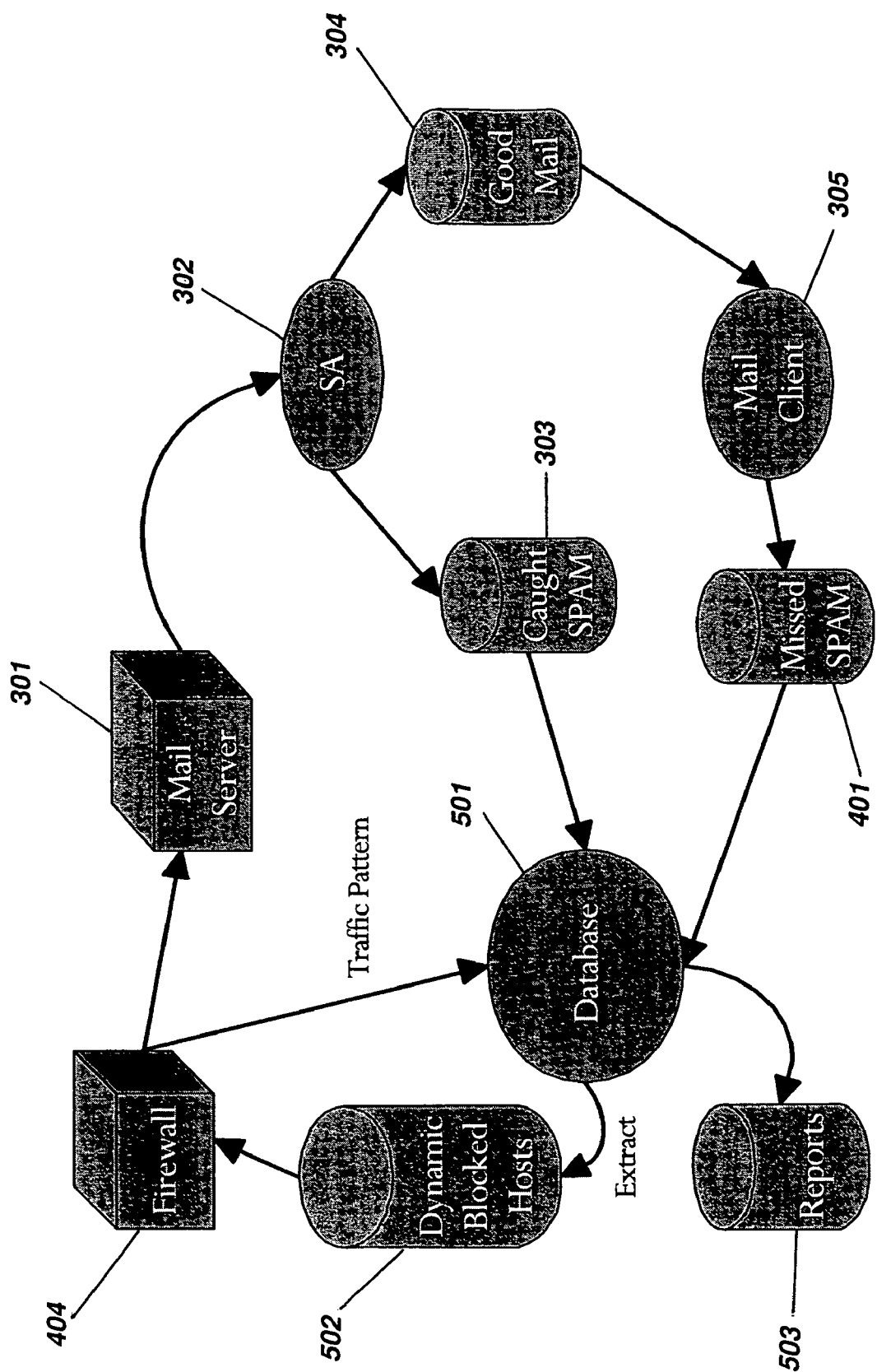
FIG. 5 shows a more complex novel method of spam filtering using a firewall.

In FIG. 5, there is shown another embodiment of the present invention. Database 501 is used to keep track of when each rule is added or removed from a dynamic list 502 of blocked addresses or subnets. This dynamic list is used by firewall 404 to apply a blocking measure for adaptively determined duration as described above. At the end of the duration, the rule is removed and the traffic pattern is monitored to determine whether spam is still being sent by the previously blocked address. If so, database 501 re-installs the address to dynamic list 502 along with a duration which may be determined using algorithms described above. The address is then blocked again by firewall 404.

Figure 7:
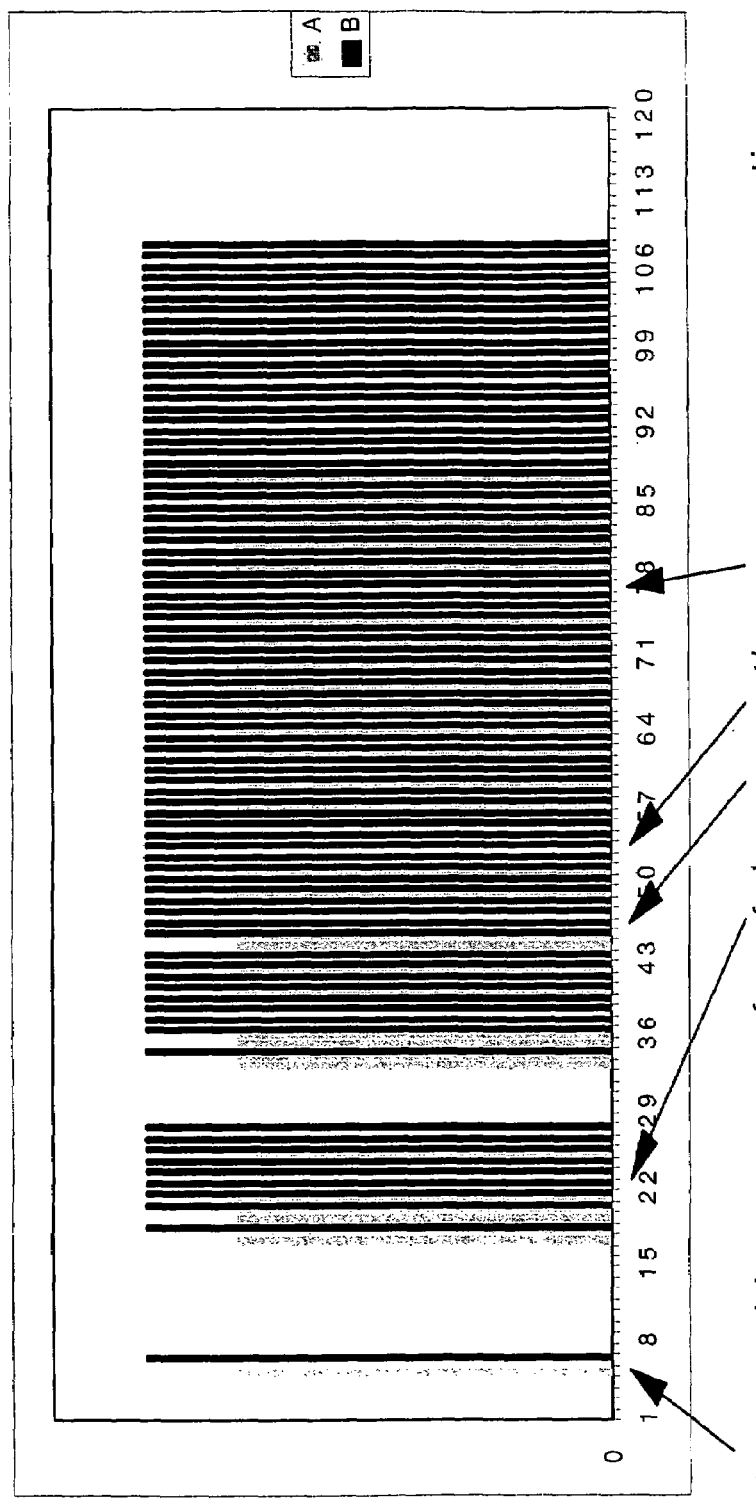
FIG. 7 shows the results in graphical form of a simulation of the present invention.

In FIG. 5, reports 503 may also be generated listing blocked addresses, re-blocked addresses, durations and the like, for review by human operators. Such reports are based on information stored in database 501. Database 501 may be any type of database known in the art capable of storing and retrieving the relevant data on spam addresses, rules, durations, and the like. Reports may be textual or graphical, such as shown in FIG. 7 described below.

The present invention includes application of progressive responses to spam traffic stimulus. Such responses are shown, for example, in the flowchart of FIG. 6. A blocking response is enforcement of a rule, such as a policy of discarding information packets having header values as defined in a rule. In an alternative embodiment, a response may also include logging suspicious traffic or rate limiting a class of traffic or some combination of blocking, logging, or rate limiting actions. Various ratios of blocking, logging, and rate limiting may also be employed.

In a rule, the range of header values in any header may be precisely one source address or ranges of header values within intervals, each interval having upper and lower limits. A rule may indicate blocking of a range of source address values, such as those covered by the prefix 1.2.3.0/24 (also expressed as 1.2.3.*).

Figure 6:
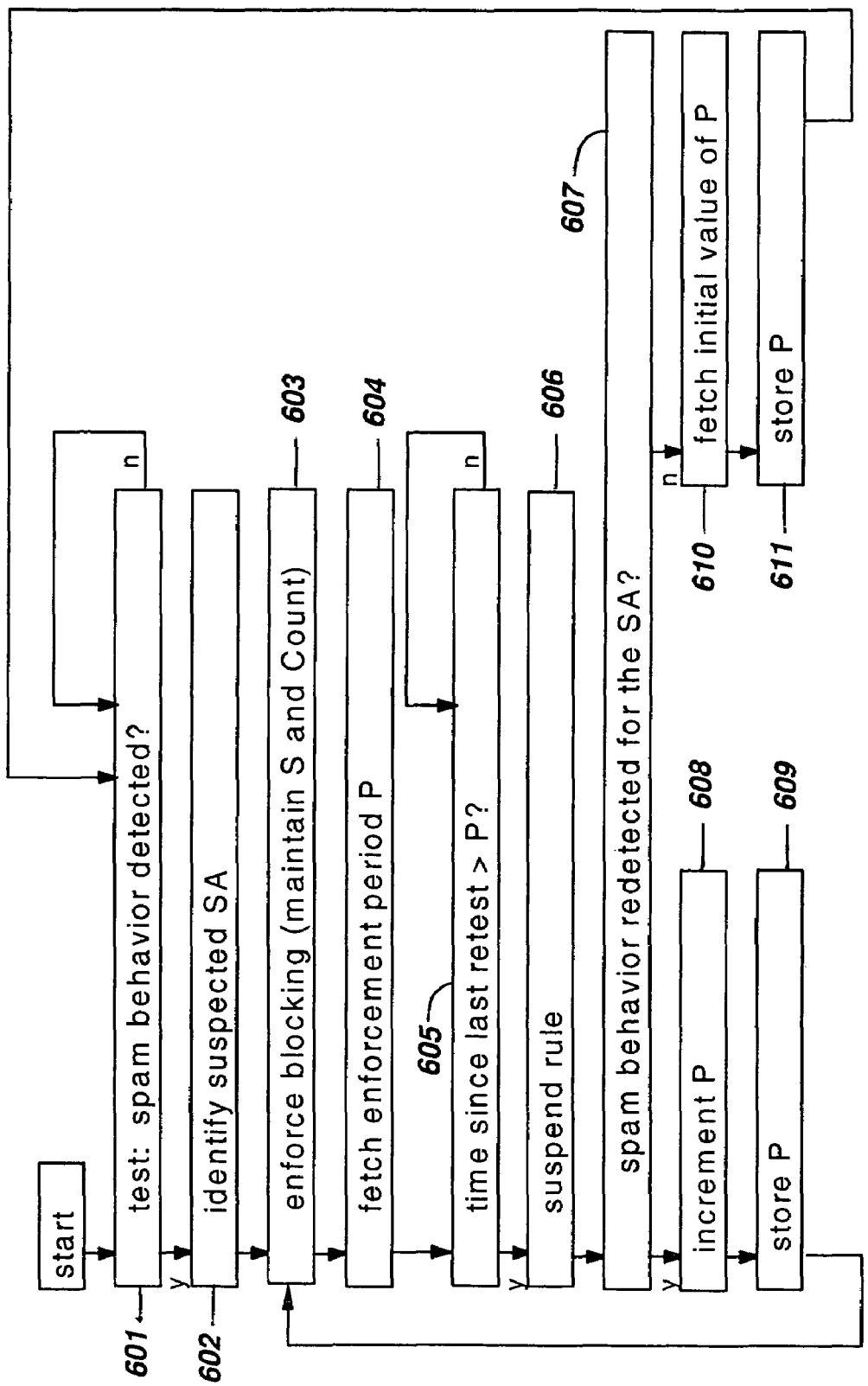
FIG. 6 is a flowchart of a preferred embodiment of the present invention.

The present invention, as described in FIG. 6, may start in a state of readiness to react. Upon analysis 601, 602 over a sample time period Dt (for example one minute), the present invention reacts by enforcing a blocking response 603. After a finite duration or time period 604, the response is tentatively suspended 605 (not enforced) for a second duration 606 or second time period. That is, the response is withdrawn while the invention determines if the spam behavior continues 607. If this retest over the second duration reveals that the spam behavior is absent 610, then the method is reset to its starting state 611. Otherwise, the blocking response is reactivated 608 after the retest and held for a new period 609 of time that may be at least as long as the previous time interval. In a preferred embodiment, the new period of time is double the previous interval, up to a pre-specified maximum time interval.

In FIG. 7, there is shown a graphical report 503 of a simulated test case. The horizontal axis numbers represent time units, e.g., minutes or any other known time units (seconds, hours, days or the like). Grey bars represent detected spam and black bars represent enforcement of a response. As noted on the left, a single instance of spam detection causes only a brief period of blocking. In the center, a longer period of spam produce a corresponding period of blocking, ending soon after the spam stops. On the right, a much longer period of spam (through time unit 83) causes blocking for a much longer period extending significantly after the spam stops before removal at time unit 108.

From the foregoing description, those skilled in the art will appreciate that the present invention provides a progressive response that applies and suspends blocking measures to defend against network spam traffic, in a way that minimizes the adverse consequences of false positives and false negatives. The foregoing description is illustrative rather than limiting, however, and the scope of the present invention is limited only by the following claims.

What is claimed is:

1. A method of blocking spam at a firewall, comprising the steps of:
    receiving a spam e-mail message in a time interval during which no blocking measure is active;
    applying a blocking measure for a duration that is determined adaptively; and
    suspending the blocking measure in accordance with a state B(t) of the blocking measure at time t for discrete values of t which are integer multiples of a time interval Dt, said discrete values of t representing t=0, Dt, 2*Dt, . . . , J*Dt, wherein J is a positive integer equal to or greater than 2;
    wherein if B(t)=I then the blocking measure is applied and if B(t)=0 then the blocking measure is suspended;
    wherein A(t)=I if a spam e-mail message has arrived during a time interval Dt immediately preceding time t and A(t)=0 otherwise;
    wherein N(t)=A(t)*(I−B(t));
    wherein S(t) is a time stamp indicating the absolute start time of a most recent sequence of time values with consecutive application of the blocking measure;
    wherein K(t) is a count of the number of times, within a present epoch of consecutive detections of spam e-mail message, that the blocking measure has been suspended and then re-applied in response to detection of a spam e-mail message;
    wherein P(t) is a duration of the blocking measure and is a non-decreasing function of K(t);
    wherein a specified positive integer L is a maximum permitted value of K(t);
    wherein t=0 is a time prior to execution of a loop of J iterations denoted as iterations 1, 2, . . . , J;
    wherein at t=0, B(0)=I, A(0)=I, S(0)=0, K(0)=0, and P(0)=P.sub.0=I*Dt, wherein I is a positive integer;
    wherein B(t), S(t), and K(t) are iteratively computed during execution of the loop such that in each iteration:

$$B(t+Dt)=N(t)*(I-B(t))+(I-N(t)*(I-B(t))) \text{ *if } (t+Dt-S(t)i, \text{ else } 0),$$

$$S(t+Dt)=B(t+Dt)*(I-B(t))*(t+Dt-S(t)+S(t),$$

$$K(t+DT)=\min\{L,N(t)*(K(t)+I)+(I-N(t))*B(t)*K(t)\},$$

t=t+DT after B(t+Dt), S(t+Dt), and K(t+Dt) have been determined.

2. The method of claim 1, wherein said determining detects identical text bodies in said e-mail message with a plurality of other e-mail messages.

3. The method of claim 2, further comprising using a hash function to determine said identical text bodies.

4. The method of claim 1, further comprising the step of providing a database to integrate said identical bodies and declare filter rules for said determining.

5. The method of claim 4, further comprising the step of dynamically adding and deleting said filter rules to a database of filter rules to be enforced.

6. The method of claim 1, wherein said duration is determined adaptively in response to a count of a number of times that the blocking measure has been applied.

7. The method of claim 6, wherein said duration is adapted according to a monotone non-decreasing function of said count.

8. The method of claim 1, wherein said duration is a count of e-mail messages.

9. The method of claim 1, further comprising the step of selecting a level of certainty of said determining by selecting an appropriately corresponding length of an initial period of rules enforcement.

* * * * *

UNITED STATES PATENT AND TRADEMARK OFFICE
CERTIFICATE OF CORRECTION

| | | |
|---|---|---|
| PATENT NO. | : 7,617,526 B2 | Page 1 of 1 |
| APPLICATION NO. | : 11/244993 | |
| DATED | : November 10, 2009 | |
| INVENTOR(S) | : Davis et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1070 days.

Signed and Sealed this

Nineteenth Day of October, 2010

David J. Kappos
*Director of the United States Patent and Trademark Office*